United States Patent [19]
Prochnow

[11] 4,336,986
[45] Jun. 29, 1982

[54] CAMERA HAVING AN INDEPENDENTLY FOCUSED RETRACTABLE OBJECTIVE LENS

[75] Inventor: Claus Prochnow, Brunswick, Fed. Rep. of Germany

[73] Assignee: Rollei-Werke Franke & Heidecke GmbH & Co. KG, Brunswick, Fed. Rep. of Germany

[21] Appl. No.: 164,497

[22] Filed: Jul. 2, 1980

[30] Foreign Application Priority Data

Sep. 4, 1979 [DE] Fed. Rep. of Germany ....... 2935588

[51] Int. Cl.³ .......................... G03B 3/00; G03B 17/04
[52] U.S. Cl. ...................................... 354/187; 354/195
[58] Field of Search .............. 354/187, 188, 189, 190, 354/191, 192, 193, 194, 195, 198

[56] References Cited
U.S. PATENT DOCUMENTS 3,798,670  3/1974  Tanaka .................................. 354/195
4,171,891 10/1979  Schrader ............................. 354/187

FOREIGN PATENT DOCUMENTS 10307   2/1956  Fed. Rep. of Germany ...... 354/195
2404687 8/1975  Fed. Rep. of Germany .

Primary Examiner—L. T. Hix
Assistant Examiner—Alan Mathews
Attorney, Agent, or Firm—Schwartz, Jeffery, Schwaab, Mack, Blumenthal & Koch

[57] ABSTRACT

Disclosed is a camera including a camera housing and an objective lens having an image axis. The objective lens for the camera is mounted in a tube which is movable between an extended exposure position and a retractive storage position. When the tube is in the extended exposure position, a locking device responsive to operation of the shutter release, increases the biasing force on the objective lens towards its extended position. The locking device is made up of several cams spring biased against two pins radially projecting from the objective tube. The cams are prevented from bearing against the pins by a control linkage which prevention is released during shutter actuation.

8 Claims, 1 Drawing Figure

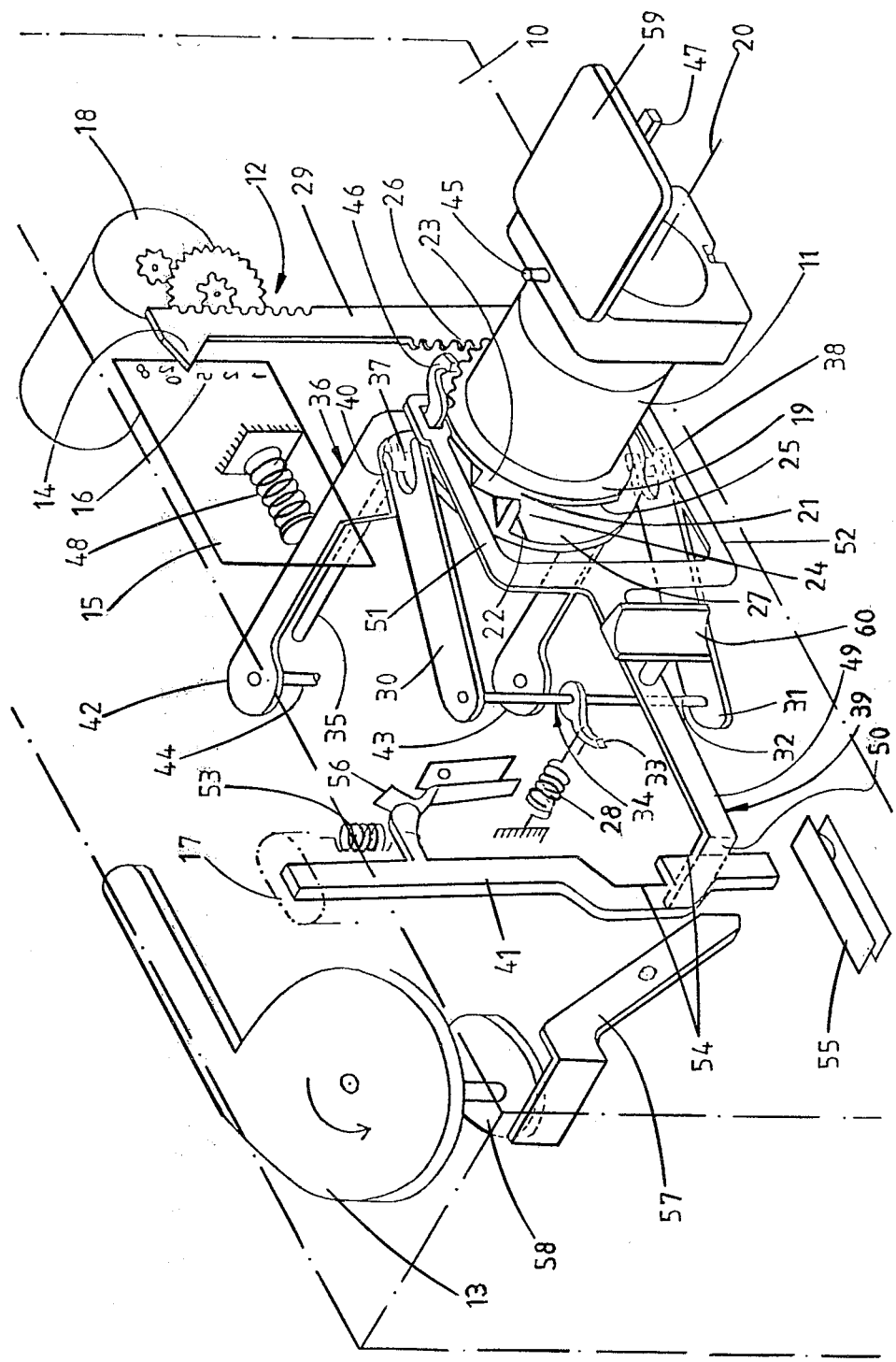

CAMERA HAVING AN INDEPENDENTLY FOCUSED RETRACTABLE OBJECTIVE LENS

BACKGROUND OF THE INVENTION

The present invention generally concerns a photographic camera and particularly, a miniature camera having a retractable focusable objective lens.

In copending patent application Ser. No. 100,358 entitled "Camera Having an Independently Focused Retractable Objective Lens," filed Dec. 5, 1979, now U.S. Pat. No. 4,280,762, a camera is disclosed which has a relatively small size when the objective lens is retracted. It has good handling, a control means for focusing the camera and viewing through the viewfinder which all facilitate the quick, simple taking of snapshots.

In the above-described camera, the objective tube is spring-biased in its extended position against an adjustable cam which accomplishes the focusing of the camera. Additionally, the same spring force is primarily responsible for extending the objective tube from its retracted position to its extended position. Thus, it is desirable on one hand to have a relatively strong spring force to extend the objective tube and at the same time maintain the objective tube in firm contact with the cam for focusing purposes and on the other hand for ease of focusing and to reduce frictional loads, it is desirable to have a very light biasing of the tube. An additional problem occurs when a relatively light spring is used in that a very small accidental pressure on the side of the objective tube can cause the tube to deflect so that the camera is not focused.

The conflicting interests created by wanting a strong spring on one hand and a weak spring on the other requires a compromise which does not optimally satisfy either of the two requirements.

SUMMARY OF THE INVENTION

It is therefore an object of the present invention to provide an improved independently focused retractable objective lens camera, said improvement comprising a mechanism which permits ease of focusing and relatively small forces involved in focusing while at the same time provides precise locking in place of the objective tube in its focused position.

The above and other objects are achieved by providing a camera housing and an objective lens with an image axis, said lens is mounted for movement substantially parallel to the image axis between an extended exposure position and a retracted storage position. The camera includes a means for manually setting the focal range of the camera. A means for variably limiting axial movement of the mount in the extended position in response to the range setting means is provided through means of a ring and cam assembly. A means for variable biasing the mount towards the extended position assures that a minimum bias is provided prior to shutter actuation to facilitate focusing but a high degree of bias is utilized during actual shutter actuation to ensure that the camera is correctly focused.

In a preferred embodiment of the present invention, a locking system is used which, simultaneously with the actuation of the shutter release, engages the objective tube to increase the bais forcing the objective tube against the means limiting axial movement.

BRIEF DESCRIPTION OF THE DRAWING

A more complete appreciation of the invention and the attendant advantages thereof will be more clearly understood by reference to the following drawing, wherein:

The drawing is a front perspective view of an independently focused retractable objective lens system with a shutter-actuated locking means for firmly positioning the objective lens in its extended position.

DETAILED DESCRIPTION OF PREFERRED EMBODIMENTS

Referring now to the drawing, a photographic still camera is shown which is one embodiment would use 35 mm roll film. The camera housing 10 indicated in dash-dot lines has an axially displaceable objective tube 11 mounted therein. In the extended position (the position necessary to take a picture with the camera) the objective tube 11 projects from housing 10 and assumes an optically proper arrangement with respect to the film (not shown) which would be located in the camera in its window. When the camera is not in use, the objective tube 11 can be completely retracted inside housing 10 so that the camera provides relatively planar external surfaces facilitating its storage or packaging.

The film transport and shutter reset lever 13 and shutter release 17 (shown in dash-dot lines) are illustrated on the upper side of housing 10. In order to clarify the presentation of the internal parts of the camera, the conventional knobs for setting aperture size, exposure speed and film speed have been omitted.

In a preferred embodiment, a motorized focusing arrangement 12 is provided with includes an electric setting motor 18 which may be controlled by a known auto-focusing system (again omitted for clarity). A pointer 14 of focusing system 12 is visible in the viewing field 15 of the camera and illustrates on range scale 16, the distance in viewer 15 which was set by the focusing arrangement 12.

A focusing ring 19 which is fixed with respect to movement along optical axis 20 is supported concentrically with respect to objective tube 11 and is free to rotate thereabout. The focusing ring 19 includes a cam means 21 which is in contact with projection 22 which is part of the objective tube 11. Cam means 21 and projection 22 cooperate to form a means for variable limiting axial movement of the objective tube 11 and it can be seen that if focusing ring 19 is revolved about optical axis 20, the extended position of objective tube 11 will vary slightly in the axial direction.

Cam means 21 and projection 22 are biased into contact with each other when the objective tube 11 extends from housing 10.

In the specific embodiment shown, cam means 21 and projection 22 are designed as wedge-shaped projections 23 and 24. Projection 23 is located on the focusing ring 19 on its backside 25 extending towards the inside of the camera housing. Lug 24 is mounted on flange 27 which projects from objective tube 11 and is solidly connected therewith. As will be obvious to one of ordinary skill in the art, a plurality of projections 23 and lugs 24 can exist at different radial positions around the periphery of the focusing ring and flange 27. Finally, focusing ring 19 includes a segment of a gear crown 26 which meshes with a gear rack 29 of focuser 12.

The primary bias of objective tube 11 in the axial direction is provided by spring 28 which is prestressed in its extended position. This spring is of such design that after the objective tube 11 has been moved into the extended position shown, it maintains a small residual force generating a given compression or bias between cam means 21 and projection 22. This bias is so chosen so as to be lower than the bias necessary to maintain the cam means and the projection in proper contact during film exposure. This lower than adequate bias permits ease of operation of the focusing means 12 especially during auto-focusing.

The extension spring 28 can be either a tension or compression spring and in the present instance is a tension spring acting on double arm rocker assembly 34. The rocker 34 comprises two arms 30 and 31 which are mutually parallel and rigidly mounted to pivot shaft 32. A third arm 33 is rigidly mounted to shaft 32 and has extension spring 28 connected thereto. In this manner, the two free ends of arms 30 and 31 are biased in the direction of extension for objective tube 11.

Objective tube 11 includes pins 37 and 38 mounted on flange 27 which projects radially outward and serve both as extension limit stops and on the other hand move in guideslot 35 to prevent rotation of the objective tube and ensure only axial displacement when the tube is retracted or extended in housing 10.

In a preferred embodiment, this slotted guide 35 in housing 10 would be present in two locations to handle diametrically opposite pins 37 and 38, although only one slotted guide 35 is shown for the sake of clarity. At the end of each of the arms 30 and 31 of double rocker 34 is a slot which encloses pins 37 and 38 forming an articulating linkage between rocker 34 and objective tube 11.

Housing 10 also includes a locking system 36 which is associated with the objective tube 11 and acts only slightly prior to and during image exposure to generate an additional compression between cam means 21 and projection 22 to ensure reliable locating of the objective tube 11 in housing 10 during actual shutter operation. This additional compression must be high enough such that accidental lateral contact of the objective tube 11 by the camera user cannot cause a deflection of the objective tube axis from the optical axis. Ideally, the additional compression for biasing is triggered by the triggering of the exposure process and lasts through closure of the camera shutter.

In a preferred embodiment, locking system 36 is coupled by means of a control linkage 39 to shutter release 17. The control linkage is so designed that locking system 36 can only engage objective tube 11 essentially simultaneously with the actuation with the shutter release 17. The locking system 36 in the embodiment shown comprises two spring loaded levers 42 and 43, which coact with pins 37 and 38 located on the objective tube 11. The levers pivot about common pivot shaft 44 which is perpendicular to the optic axis 20 and the levers are biased in a direction transverse to the optic axis 20 by compression spring 48. Each lever includes a cam portion 40 which is essentially an acute angle with respect to the optic axis 20.

A control bar 41 connected to the shutter release 17, is displaced upon actuation of the shutter release, and control slider 49 acts upon levers 42 and 43 of the control linkage 39. The control slider 49 has a tang 50 which rests against control bar 41, which has a notch 54 into which controlled tang can move when shutter release 17 is displaced a predetermined amount. Control slider 49 in the preferred embodiment is fork-shaped, having tines 51 and 52 which engage levers 42 and 43. The control bar 41 is longitudinally displaceable against the bias of return spring 53 by means of the operator pressing upon the shutter release 17. It will be seen that the bias of spring 48 on levers 42 and 43 will force cam 40 to bias the objective tube in its extended position. This bias is additional to the bias in the extended position provided by extension spring 28. Movement of levers 42 and 43 is prevented by virtue of control linkage 39 bearing against control bar 41. Thus, spring 48 biases levers 42 and 43 against the forkshaped tines 51 and 52 of control linkage 39 which in turn is then biased against the slide of control bar 41. However, when shutter release 17 has been depressed to the extent that control linkage 39 can pass into slot 54, spring 48 causes levers 42 and 43 to move further towards control bar 41. This further movement permits cam 40 to bear against pins 37 and 38 and thus further bias in a stronger manner, the objective tube towards its extended position. This biasing ensures firm and complete contact between the cam means 21 and projection 22 during the shutter release operation.

A camera shutter release switch 55 is located at the end of travel of control bar 41 and thus the shutter will only be released after the control bar has moved sufficiently in its longitudinal direction to permit control linkage 39 and tang 50 to move into slot 54 thereby locking the objective lens into position for shutter release. An additional camera switch may be mounted so as to be engaged during initial displacement of control bar 41 for the switching on of automatic aperture control or an auto-focus system. It may be advantageous to locate this switch such that it will close a specific time before control bar 41 releases slider 49 such that any auto-focusing will take place prior to the release of the locking system 36 which will then force cam member 21 and projection 22 together locking the objective tube 11 in housing 10. This locking system then obviates any danger of objective tube misalignment and permits highly accurately focused pictures to be taken. Of course, until shutter release 17 is depressed, cam means 40 will be prevented at least to a large extent from additionally biasing objective tube 11 in its extended position such that under the light biasing pressure of extension spring 28, the reduced friction between cam means 21 and projection 22 permits easy focusing especially by the auto-focusing system shown.

The camera shown in the drawing is in its picture-taking condition with objective tube 11 projection from housing 10 and biased in this extended position by double rocker 34. Lug 24 of projection 22 rests upon cam means 21 on the backside of the focusing ring 19. In this condition, the bias between the projection and cam means is relatively low and thus there are relatively low frictional forces therebetween facilitating ease of rotation of focusing ring 19. As shown, the locking system 36 is still inactivated and control tang 50 rests against the side of control bar 41. Thus, the control bar 41 keeps levers 42 and 43 of the locking system biased against the force of compression spring 48 such that cams 40 of the levers do not to a substantial degree anyway, press against pins 37 and 38.

When the shutter release 17 is depressed, the control bar 41 is displaced longitudinally downward against return force 53. In a preferred embodiment, the operating sequence permits switch 56 to close whereby an auto-focus system is activated. This auto-focus system in a known manner measures the range to the picture object and in accordance with any discrepancy between the measured range and the focus of the objective tube 11, will emit a corresponding control signal to setting motor 18. This motor drives the gear rack 29 which in turn rotates the focusing ring 19. The objective tube 11 is displaced in its axial direction by means of cam means 21 bearing on projection 22 until the objective is sharply focused on the film plane. The range set by the auto-focus system is displayed by pointer 14 on the distance scale 16 in the viewer 15 of the camera. During this focusing process, the position of control tang 50 and hence control slider 49 has remained unchanged in view of the design of slot 54 of control bar 41 with an end result that the locking system 36 remains inactive.

As the control bar 41 is further displaced in the longitudinal direction, control tang 50 is permitted to move into slot 54 permitting control slider 49 to move transversely with respect to the optic axis 20 (to the left in the drawing) by a predetermined amount. Compression spring 48, biasing levers 42 and 43, permits cams 40 of control levers 41 and 42 to bear against pins 37 and 38 further biasing objective tube 11 in its extension direction. Lugs 24 of projections 22 are strongly pressed against cam means 21 on the backside of focusing ring 19. Inasmuch as the focusing ring 19 is fixed against axial movement, the objective tube will now be fixed with respect to the housing with a high degree of force in the position previously determined by the auto-focusing system. Thus, the objective tube is now locked in its optically accurate position for taking a picture with respect to the camera housing.

Upon further depressing the shutter release 17, control bar 41 is displaced until it closes shutter release switch 55 whereupon the shutter is opened and closed in a known manner exposing the photographic film and completing the picture-taking process.

In order to reset the locking system 36 into its inactive position with cams 40 not heavily bearing against pins 37 and 38 such that focusing ring 19 is again rotatable with very light forces, a return lever 57 is provided in the control linkage 39 which is coupled to the shutter reset and/or film advance lever. In a preferred embodiment, a control cam 58 is mounted to the film advance lever 13, said cam 58 revolving when the lever 13 is advanced in the direction of the arrow shown. Return lever 57 is pivoted about the axis shown and when cam 58 bears against one end of the lever, the other end bears against control tang 50. When the film advance lever 13 is pivoted (counter-clockwise in the illustrated embodiment) the free end of the lever arm resting against control tang 50 will move towards the optic axis 20. Control slider 49 is moved so as to lift control tang 50 out of slot 54 permitting control bar 41 under the influence of return spring 53 to move the shutter release 17 to its initial position. When the film advance lever 13 is released, the biasing of lever 57 by cam 58 will be terminated and control tang 50 will again rest against control bar 41 as shown in the drawing. In this position, the objective is no longer locked in position and instead is biased in its extended position primarily by extension spring 28 and thus, the camera assembly is ready for a further sequence of auto-focusing and picture-taking.

Objective tube 11 can be retracted into the camera housing 10 by axially pressing on the objective tube. With pins 37 and 38 sliding in guide slot 35, arms 30 and 31 of the double rocker 34 pivoted to the rear placing extension spring 28 in further tension. The objective tube 11 completely disappears into housing 10 whereupon the objective tube 11 is locked against the bias of extension spring 28. Levers 42 and 43 of the locking system 36 further act as retaining levers having at their free end an indexing latch 46 which engage indexing pins 45 and 47 on the objective tube 11. In a preferred embodiment, pins 45 and 47 can be mounted with one radially projecting outward from the front-end of the objective tube and the other radially projecting from an objective cover 59 which is hinged on the front of the objective tube 11. When the cover is pushed down into position over the objective tube 11, pin 47 will extend radially outward with respect to the optical axis 20. When the objective tube 11 is pressed all the way into the camera with the cover 59 closed, pins 45 and 47 engage latches 46 which retain the objective tube 11 in its retracted position against the bias of extension spring 28. Additionally, the cover is maintained in its covered position against the bias of an opening spring (not shown).

When it is desired to convert the camera from its storage or shipping condition into a manner for taking pictures, objective tube 11 must be released such that the tube can be extended to its proper position. Actuation knob 60 which is accessible for manual activation on the outside of the camera housing, forces lever 49 in a direction transverse to the optic axis which also displaces levers 42 and 43 against the force of compression spring 48. This causes latches 46 to disengage the two indexing pins 45 and 47 releasing the objective tube 11 for extension. The extension spring 28 biases the double rocker 34 which moves objective tube 11 into its extended position while at the same time cover 59 is unlatched to move into its extended position.

Although the invention has been described relative to a specific embodiment thereof, it is not so limited and many modifications and variations thereof will be readily apparent to those skilled in the art in light of the above teachings. It is, therefore, to be understood that, within the scope of the appended claims, the invention may be practiced otherwise then as specifically described.

The preferred embodiments of the invention in which an exclusive property or privilege is claimed are defined as follows:

1. A camera including a camera housing, an objective lens having an image axis and a shutter release mechanism, said camera further including:
   means for setting a focal range of said camera;
   means for mounting said objective lens for movement substantially parallel to said image axis, between an extended exposure position and a retracted storage position;
   means for variably limiting axial movement of said mounting means in said extended position;
   means, responsive to said range setting means, for varying said limiting means; and
   means for variably biasing said mounting means towards said extended position, such that said mounting means is less strongly biased toward said extended position during operation of said varying means and more strongly biased toward each extended position during operation of shutter release mechanism.

2. A camera according to claim 1, wherein said means for variably biasing is operatively connected to and responsive to said shutter release mechanism for more strongly biasing said mounting means towards said extended position when said shutter release means is activated.

3. The camera of claim 2, wherein said mounting means comprises a tube with said lens mounted therein, said varying means comprises an annulus surrounding said tube and axially fixed with respect to said housing, said limiting means comprising a projection fixed on said tube and in contact with a cam on said annulus when said tube is in said extended exposure position.

4. The camera according to one of claims 1-3, wherein said means for variably biasing includes locking means for biasing said objective tube towards its extended position, and control linkage means for coupling said locking means to said shutter release means such that said locking means biases said objective tube only during actuation of said shutter release means.

5. The camera according to claim 4 wherein said locking means comprises at least one spring loaded lever, and said mounting means includes at least one abutment pin coacting with said locking means.

6. The camera according to claim 5, wherein said spring loaded lever comprises a lever biased by a spring in a direction transverse to the image axis, said lever including a cam means, coacting with said abutment pin, for biasing said mounting means towards said extended exposure position.

7. The camera according to claim 6, wherein said control linkage means comprises a linkage connected to said lever, said shutter release mechanism including a detent, said linkage located between said shutter release mechanism and said lever and preventing movement of said lever toward said shutter release mechanism beyond a predetermined amount, said linkage permitting said lever to move toward said shutter release mechanism beyond said predetermined amount when said shutter release mechanism is at least partially actuated and said linkage extends into said detent.

8. A camera including a camera housing, an objective lens having an image axis and a shutter release mechanism, said camera further including:
　means for setting a focal range of said camera;
　means for mounting said objective lens for movement between an extended exposure position and a retracted storage position;
　means for variably limiting movement of said mounting means in said extended position;
　means for varying said limiting means in response to said range setting means; and
　means for biasing said mounting means against said limiting means such that said mounting means is less strongly biased against said limiting means during operation of said varying means and more strongly biased against said limiting means during operation of said shutter release mechanism.

* * * * *